US 12,483,545 B2

United States Patent
Gopalakrishnan et al.

(10) Patent No.: US 12,483,545 B2
(45) Date of Patent: Nov. 25, 2025

(54) PROVIDING REMOTE ACCESS TO SERVICE DEVICES TO FACILITATE SECURE TRANSACTIONS

(71) Applicant: Truist Bank, Charlotte, NC (US)

(72) Inventors: Muthu Gopalakrishnan, Suwanee, GA (US); Ryan Loesch, Cumming, GA (US)

(73) Assignee: Truist Bank, Charlotte, NC (US)

( * ) Notice: Subject to any disclaimer, the term of this patent is extended or adjusted under 35 U.S.C. 154(b) by 284 days.

(21) Appl. No.: 18/331,985

(22) Filed: Jun. 9, 2023

(65) Prior Publication Data

US 2024/0414537 A1 Dec. 12, 2024

(51) Int. Cl.
*H04L 9/40* (2022.01)
*H04W 12/06* (2021.01)
*H04W 12/08* (2021.01)
*H04W 12/47* (2021.01)
*H04W 12/63* (2021.01)

(52) U.S. Cl.
CPC ........... *H04L 63/083* (2013.01); *H04W 12/06* (2013.01); *H04W 12/08* (2013.01); *H04W 12/47* (2021.01); *H04W 12/63* (2021.01)

(58) Field of Classification Search
CPC .................................................. H04L 63/083
See application file for complete search history.

(56) References Cited

U.S. PATENT DOCUMENTS

| 10,325,082 B2* | 6/2019 | Inokuchi | G06Q 10/10 |
| 10,706,400 B1* | 7/2020 | Puffer | G06Q 20/38215 |
| 2018/0167392 A1* | 6/2018 | Zakaria | H04W 12/068 |
| 2021/0297246 A1* | 9/2021 | Peng | H04L 9/0825 |

* cited by examiner

*Primary Examiner* — Bradley W Holder
(74) *Attorney, Agent, or Firm* — Kilpatrick Townsend & Stockton LLP; Michael A. Springs, Esq.

(57) ABSTRACT

A system can be provided that can enable remote access to IoT service devices to facilitate secure transactions. For example, the system can include a IoT service device positioned in a location associated with a service provider. The system can also include a computing environment, which may receive, from a mobile device, a request to perform a function of the IoT service device. The request can include authentication credentials for a user account. Further, the computing environment can authenticate a user of the mobile device based on the authentication credentials. The computing environment may also authenticate the mobile device based on a distance between a location of the mobile device and the location associated with the service provider being less than a threshold distance. Additionally, the computing environment may transmit an application programming interface (API) call to the IoT service device to cause the IoT service device to perform the function.

17 Claims, 5 Drawing Sheets

PROVIDING REMOTE ACCESS TO SERVICE DEVICES TO FACILITATE SECURE TRANSACTIONS

TECHNICAL FIELD

The present disclosure relates generally to secure transactions and, more particularly (although not necessarily exclusively), to providing remote access to service devices to facilitate secure transactions between the service devices and user accounts.

BACKGROUND

A service provider can resolve service events for users at a location associated with the service provider. For example, a user can wait in a queue at the location to have a service event resolved by authorized personnel. However, waiting in the queue can be time-consuming. Thus, it can be desirable to automate the service events, such as by implementing service devices at the location associated with the service provider. The users can interact with the service devices, such as automated teller machines (ATMs), to cause the service devices to perform functions (e.g., the service events). For example, the users can interact with the ATMs to cause the ATMs to withdraw funds, deposit funds, or perform other suitable service events.

Additionally, there can be security concerns with automating the service events. Current service devices can require that users input pin numbers or access cards to authenticate with the service device prior to the user requesting that the service device perform service events. The pin numbers and access cards, however, may be stolen and may not be sufficient for authenticating the user. Therefore, there can be a need for improved security mechanisms for service devices.

SUMMARY

Remote access to Internet of things (IoT) service devices can be provided to facilitate secure transactions between the IoT service devices and user accounts. For example, a system described herein can include an IoT service device positioned in a location associated with a service provider. The system can also include a computing environment. The computing environment can be configured to control the IoT service device by receiving, from a mobile device, a request to perform at least one function of the IoT service device. The request can include authentication credentials for a user account associated with the service provider. The computing environment can be further configured to control the IoT service device by authenticating a user of the mobile device based on the authentication credentials. Additionally, the computing environment can be configured to control the IoT service device by authenticating the mobile device based on a distance between a location of the mobile device and the location associated with the service provider being less than a threshold distance. The computing environment can be configured to control the IoT service device by transmitting, in response to authenticating the user and the mobile device, an application programming interface (API) call to the IoT service device to cause the IoT service device to perform the at least one function. The at least one function can involve a secure service event between the IoT service device and the user account.

In another example, a computer-implemented method described herein can include receiving, from a mobile device, a request to perform at least one function of an IoT service device. The IoT service device can be positioned in a location associated with a service provider. The request can include authentication credentials for a user account associated with the service provider. The computer-implemented method can further include authenticating a user of the mobile device based on the authentication credentials. Additionally, the computer-implemented method can include authenticating the mobile device based on a distance between a location of the mobile device and the location associated with the service provider being less than a threshold distance. The computer-implemented method can further include transmitting, in response to authenticating the user and the mobile device, an application programming interface (API) call to the IoT service device to cause the IoT service device to perform the at least one function. The at least one function can involve a secure service event between the IoT service device and the user account.

In an example, a non-transitory computer-readable medium can include instructions that are executable by a processor for causing the processor to perform operations including receiving, from a mobile device, a request to perform at least one function of an IoT service device. The IoT service device can be positioned in a location associated with a service provider. The request can include authentication credentials for a user account associated with the service provider. The operations can further include authenticating a user of the mobile device based on the authentication credentials. Additionally, the operations can include authenticating the mobile device based on a distance between a location of the mobile device and the location associated with the service provider being less than a distance threshold. The operations can further include in response to authenticating the user and the mobile device, transmitting an application programming interface (API) call to the IoT service device to cause the IoT service device to perform at least one function. The at least one function can involve a secure service event between the IoT service device and the user account.

DETAILED DESCRIPTION

Certain aspects and examples of the present disclosure relate to providing remote access to service devices to facilitate secure transactions between the service devices and user accounts. In some examples, the service devices can be an IoT service devices. Examples of service devices can include automated teller machines (ATMs), electronic funds transfer (EFT) terminals, teller cash recyclers (TCRs), check scanners, printers, or other suitable devices associated with a service provider (e.g., a financial institution). The IoT service devices can be service devices that are connected to a network, such as a local area network (LAN) or the internet. The IoT service devices can be in communication with a computing environment (e.g., a IoT computing platform), mobile devices, service devices, other IoT devices, etc. via the network. For example, the IoT service devices can receive requests to perform functions, receive requests for data, transmit data, or otherwise communicate with the IoT computing platform, the mobile devices, the service devices, the other IoT devices, etc. via the network.

In some examples, the IoT service devices can be situated within a location associated with the service provider and the remote access can be provided to mobile devices. In particular, the remote access may be provided to mobile devices associated with a service provider. For example, the mobile devices can be authorized mobile devices, such as those belonging to employees or other suitable authorized personnel for the service provider. Additionally, the mobile devices can be registered with user accounts associated with the service provider or can be running a software application associated with the service provider.

To provide the remote access to the mobile devices, authentication of the mobile devices can be performed. For example, a terminal handler associated with the computing environment can authenticate a mobile device on behalf of an IoT device. The terminal handler can be a software program, a computer processor, or an application programming interface (API) for managing interactions between the mobile devices and the IoT service devices. Additionally, in some examples, authenticating the mobile devices can include verifying that the mobile device is within a proximity of the IoT service device (e.g., within the location associated with the service provider), detecting that the mobile device is registered with the service provider, detecting that the mobile device is associated with a user account, or combination thereof. Additionally or alternatively, users of the mobile devices may be authenticated. For example, authenticating a user of the mobile device may include verifying that the user is associated with the user account, such as via authentication credentials, an answer to a security question, etc.

Additionally, via the remote access, the mobile devices can transmit requests for the IoT service devices to perform one or more functions. The functions can involve the IoT service device performing a service event (e.g., a secure transaction) with respect to a user account associated with the service provider. For example, the IoT service device can perform the secure transaction with the user account to transmit data to or from the user account, withdraw funds from the user account, etc. In some examples, the mobile devices may transmit the requests to the computing environment (e.g., an IoT computing platform, a computing cluster, etc.). In response, the computing environment can transmit application programming interface (API) calls to the IoT service devices to cause the IoT service devices to perform the functions.

Current systems can involve the user directly interacting with the service device. For example, the service device can include a user interface with options for the functions. The user can select, via the user interface, an option to cause the service device to perform a function. Additionally, there can be security concerns with the current systems. For example, in the current systems, a pin number, an access card, or a combination thereof can be used to authenticate with the service device. The user may input the pin number or the access card, both of which may be associated with the user account, via the user interface. The service device can authenticate the user based on the pin number or the access card, and can, for example, withdraw funds from the user account. However, if for example, the pin number or the access card, are stolen, the service device may not be able to detect the security breach and may still perform the withdrawal of funds. Additionally, due to the security concerns with current systems, the functions that the service devices can perform may be limited. For example, the user may only be able to withdraw funds up to a withdraw limit (e.g., up to $500) via the service device.

Examples of the present disclosure can overcome one or more of the above-mentioned problems via a computing environment that can receive requests for the IoT service devices to perform functions from the mobile devices. The computing environment can further authenticate the mobile devices and users of the mobile devices prior to causing the IoT service devices to perform the functions. In this way, the computing environment can facilitate secure interactions between the IoT service devices and the user accounts. For example, if a user's authentication credentials are stolen, a request for an IoT service device to perform a function with respect to a user account may be transmitted with the authentication credentials. In response, the computing environment may authenticate the user based on the authentication credentials. But, if the mobile device from which the request was transmitted is not registered to the user account, the computing device may not authenticate the mobile device. Thus, the computing environment may detect a possible security breach and may not perform the requested function. Due to the improved security of authenticating both the mobile device and the user, the computing environment may enable the IoT device to perform highly secure service events, such as a withdrawal of funds above the withdrawal limit. Additionally, due to the computing environment causing the IoT service devices to perform the functions in response to the requests transmitted via the mobile devices, the secure interactions can be initiated in a contactless manner. Therefore, the IoT service devices may not include screens or other suitable mechanisms for user interaction.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
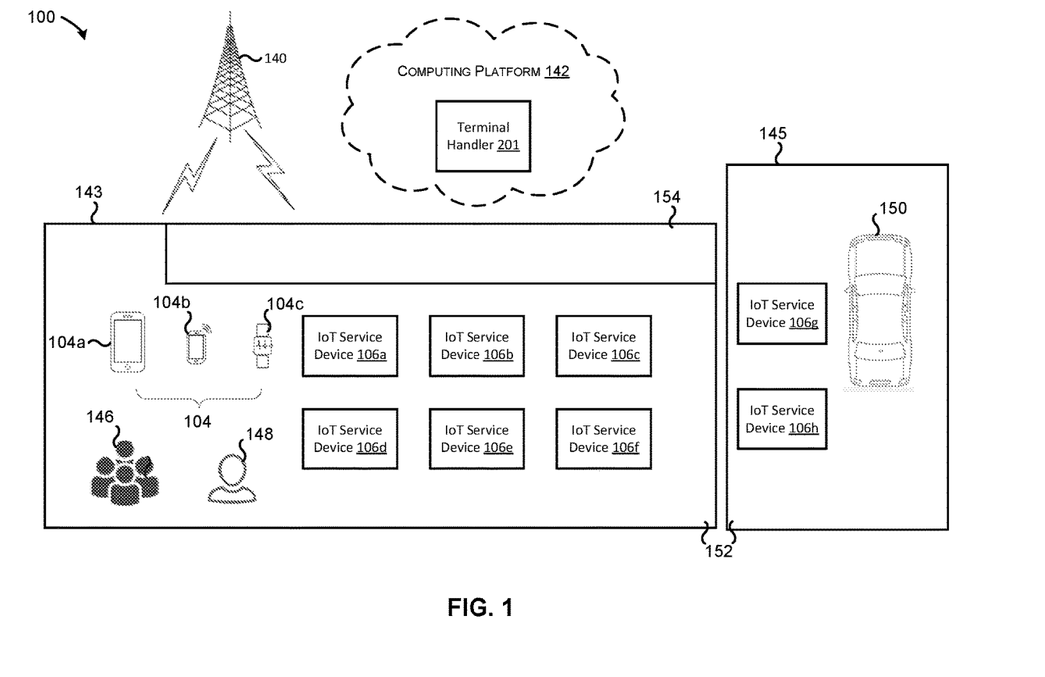
FIG. 1 is a schematic of an example of an IoT service device environment according to one example of the present disclosure.

FIG. 1 is a schematic of a IoT service device environment 100 according to one example of the present disclosure. The IoT service device environment 100 can include an indoor area 143 and an outdoor area 145. The IoT service device environment 100 can also include user accessible areas 152 and user inaccessible areas 154. The user accessible areas 152 can include at least one user 146, authorized personnel 148, at least one user vehicle 150, one or more devices 104, and a plurality of IoT service devices 106. The IoT service device environment 100 can also include one or more communication networks 140 and a computing platform 142. Examples of the computing platform 142 include cloud platforms or Internet of Things (IoT) platforms. The computing platform 142 can include a terminal handler 201. The user inaccessible areas 154 can include at least one auxiliary device 108.

The one or more devices 104 and the computing platform 142 can send and receive communication with each IoT service device of the plurality of IoT service devices 106 over the one or more communication networks 140. The computing platform 142 can send and receive communication with the one or more devices 104. The one or more communication networks 140 may correspond to one or more Wide Area Networks ("WANs"), such as the Internet, through which the computing platform 142, the one or more devices 104, and each IoT service device of the plurality of IoT service devices 106 may communicate with servers via web browsers or user-side applications, to establish communication sessions, request and receive web-based resources, and access other features of applications or services.

The plurality of IoT service devices 106 can include IoT service devices 106a-106h. Although eight IoT service devices are depicted in FIG. 1, the plurality of IoT service devices 106 can include any number of IoT service devices, including one IoT service device. As illustrated in FIG. 1, some IoT service devices of the plurality of IoT service devices 106 can be indoor IoT service devices (106a-106f) located in the indoor area 143. Other IoT service devices can be outdoor IoT service devices (106g and 106h) located in the outdoor area 145. The outdoor IoT service devices (106g and 106h) can be accessible to a user within the at least one user vehicle 150.

Each IoT service device can include or be associated with a near-field communication (NFC) token. A user of the one or more devices 104 can request access to a IoT service device by performing a tap gesture by placing the one or more devices 104 close to the NFC token on or near the IoT service device. In some examples, a user can request access to the IoT service device by performing a similar tap gesture by placing an access card close to the NFC token. Examples of IoT service devices can include ATMs, electronic funds transfer (EFT) terminals, teller cash recyclers (TCRs), check scanners, printers, etc. In some examples, the IoT service device can only be accessible via the mobile device, meaning the IoT service device can lack a screen or other suitable mechanisms for user interaction.

As illustrated in FIG. 1, devices 104a-104c, including tablet computers 104a, smartphones 104b, and smart watches 104c, may access any service device of the plurality of IoT service devices 106 via a Local Area Network ("LAN") or WAN, as well as mobile telecommunication networks, short-range wireless networks, or various other communication network types (e.g., cable or satellite networks). Although certain examples herein are described in terms of mobile devices, in other examples, the one or more devices 104 may additionally or alternatively include other mobile or non-mobile devices (e.g., desktop computers, laptop computers, and the like) capable of accessing any service device of the plurality of IoT service devices 106 via the one or more communications networks 140. The one or more devices 104 can be a user-based device associated with the at least one user 146 or a device associated with the authorized personnel 148.

The one or more devices 104 can transmit requests that the at least one IoT service device of the plurality of IoT service devices 106 perform at least one function. The terminal handler 201 of the computing platform 142 can receive the request, authenticate the one or more devices 104, and, upon authentication, transmit an API call to the at least one IoT service device to cause the IoT service device to perform the at least one function.

The terminal handler 201 of the computing platform 142 can manage each IoT service device of the plurality of IoT service devices 106 and the at least one auxiliary device 108. The at least one auxiliary device 108 can include auxiliary devices that are accessible only by authorized personnel 148, such as printers, copiers, or user inaccessible IoT service devices. The terminal handler 201 can receive requests for each IoT service device to perform the at least one function, grant or deny the requests, initiate a step-up authentication protocol, detect an issue with any IoT service device, notify the authorized personnel 148 of the issue, or contact technician specialists to resolve the issue.

Examples of the issues can include technical issues (i.e., a technical malfunction of the IoT service device), routine maintenance issues (i.e., a TCR has run out of cash, the at least one auxiliary device 108 is out of paper, etc.), non-routine maintenance issues, or issues with authenticating a device associated with a user (i.e., the user recently changed devices or changed addresses).

In some examples, the authorized personnel 148 can use a device associated with the authorized personnel 148 to request that at least one IoT service device of the plurality of IoT service devices 106 perform the at least one function. Thus, the request by the authorized personnel 148 can be an initial request to initiate a service event on behalf of a user. In other examples, the request by the authorized personnel 148 can be a second request following a first request initiated by the at least one user 146 through a user-based device. The second request can occur when the terminal handler 201 notifies the authorized personnel of an issue, such as an authentication issue associated with the user-based device. The authorized personnel can supplement or override an authentication protocol and assist in completing the interaction event on behalf of the user.

Figure 2:
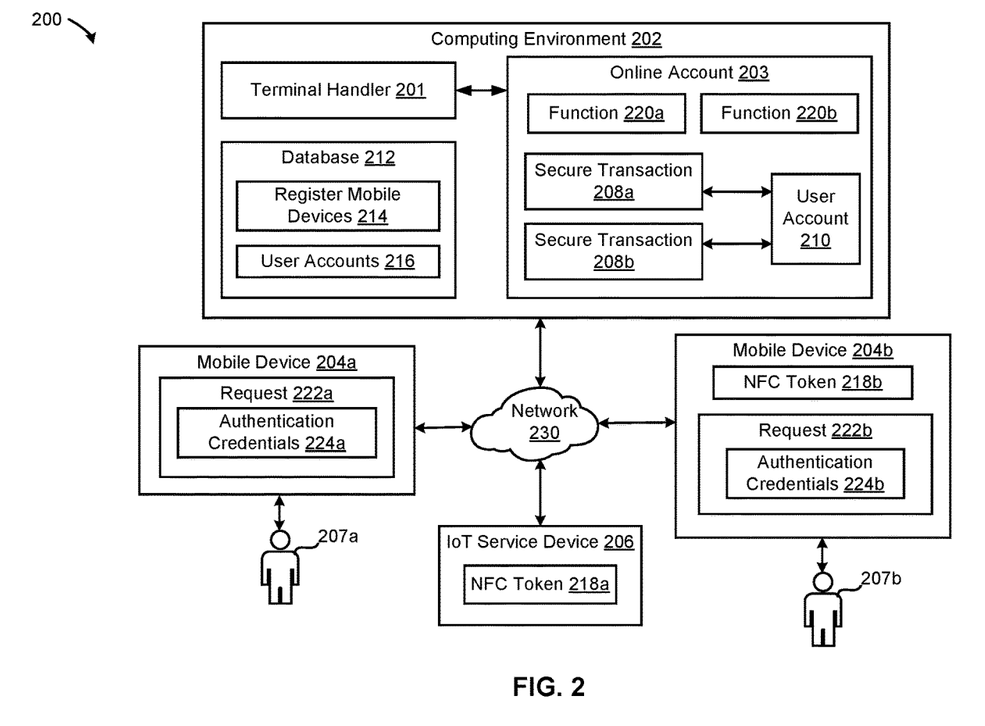
FIG. 2 is a block diagram of an example of a system for facilitating secure transactions between IoT service devices and user accounts according to one example of the present disclosure.

FIG. 2 is a block diagram of an example of a system 200 for facilitating secure transactions between IoT service devices and user accounts according to one example of the present disclosure. The system 200 includes a computing environment 202. In some examples, the computing environment 202 may be a distributed computing environment, such as a cloud computing system, an IoT computing platform, or a computing cluster, formed from one or more nodes (e.g., physical or virtual servers) that are in communication with one another via a network 230. Additionally, the computing environment 202 can be in communication with mobile devices 204a-b and an IoT service device 206 via the network 230. Examples of the network 230 can include a local area network (LAN) or the Internet. The computing environment 202 can be formed from a physical infrastructure that includes various network hardware, such as routers, hubs, bridges, switches, and firewalls. The physical infrastructure can also include one or more servers. The servers may provide backend support for a mobile application or may provide a web interface for enabling a user to interact with the IoT service device 206, the user account 210, or a combination thereof.

In an example, a first user 207a may establish the user account 210 with a service provider. The user account 210 may be of any suitable type of account. For example, the service provider may be a bank and the user account 210 may be a deposit account. Separately from establishing the user account 210, the first user 207a may register for an online account 203 with the service provider for use in monitoring and performing functions related to the underlying user account 210. The first user 207*a* may then link the online account to the underlying user account 210 hosted by the service provider. The first user 207*a* can also register the online account 203 with a first mobile device 204*a*. Examples of the first mobile device 204*a* can include a mobile phone, a laptop, a tablet, or a smart watch. Additionally, the online account 203 can be in communication with the IoT service device 206 such that the online account 203 can be used to access and control the IoT service device 206.

As a result of registering the online account 203 with the first mobile device 204*a*, the first user 207*a* may obtain access to the online account 203 via the first mobile device 204*a*. For example, the first user 207*a* may access the online account 203 via the mobile application or the web interface. In doing so, due to the online account 203 being in communication with the IoT service device 206, the first user 207*a* can obtain access to functions 220*a-b* of the IoT service device 206 and can transmit requests for the IoT service device to perform the functions 220*a-b*.

In some examples, the first user 207*a* may obtain initial access to the online account 203, such as by accessing the mobile application on the first mobile device 204*a*. Then, the first user 207*a* may perform an authentication process at the initial access. For example, the first user 207*a* can provide first authentication credentials 224*a* (e.g., a username and password) at the initial access. In a particular example, a QR code associated with the IoT service device 206 can be scanned using the first mobile device 204*a*. The scanning of the QR code can cause the first user 207*a* to obtain the initial access and be prompted to perform the authentication process via the first mobile device 204*a*. Completion of the authentication process can cause the first mobile device 204*a* to automatically transmit a request for the IoT service device to perform one or more of the functions 220*a-b*.

In another example, completion of the authentication process can cause the computing environment 202 to provide access for the first mobile device 204*a* to the online account 203. The online account 203 can include the options for the functions 220*a-b*, which can be selected by the first user 207*a* via the first mobile device 204*a*. Selection of a function by the first user 207*a* can cause the first mobile device 204*a* to transmit a request for the IoT service device to perform a function to the computing environment 202.

In a particular example, the first mobile device 204*a* may transmit a first request 222*a* to the computing environment 202. The first request 222*a* can be a request for the IoT service device 206 to perform a first function 220*a*. For example, the IoT service device 206 can be an ATM that is in communication with the computing environment 202 via the network 230 and the first function 220*a* can be for withdrawing funds from the user account 210. The first request 222*a* can include an amount of funds to be withdrawn. The first request 222*a* can also include the first authentication credentials 224*a*, which may be associated with the online account 203, the user account 210, the IoT service device 206, or a combination thereof.

In response to receiving the first request 222*a*, the computing environment 202 can authenticate the first mobile device 204*a*. The computing environment 202 may also authenticate the first user 207*a* of the first mobile device 204*a*. To authenticate the first user 207*a*, the computing environment 202 may verify that the authentication process was successful (i.e., verify that the username and password are valid for authenticating with the online account 203). Additionally or alternatively, the computing environment 202 may verify that the first authentication credentials 224*a* are valid for authenticating with the user account 210, online account 203, the IoT service device 206, or a combination thereof.

Additionally, to authenticate the first mobile device 204*a*, the computing environment 202 can determine that the first mobile device 204*a* is proximate to the IoT service device 206. For example, the computing environment 202 may detect a location of the first mobile device 204*a*, such as by accessing location services of the first mobile device 204*a*. Then, the computing environment 202 may determine a distance between the location of the first mobile device 204*a* and a location of the IoT service device 206. The location of the IoT service device 206 may be a secure location controlled by or otherwise associated with the service provider. The computing environment 202 may further determine that the distance is less than a threshold distance to authenticate the first mobile device 204*a*.

Moreover, in some examples, the computing environment 202 may detect that the first mobile device 204*a* scanned the QR code to determine that the first mobile device 204*a* is proximate to the IoT service device 206. Additionally or alternatively, the computing environment 202 may determine that the first mobile device 204*a* is proximate the IoT service device 206 using near field communication (NFC). For example, the IoT service device 206 can have or can be associated with a first NFC token 218. The first user 107*a* may perform a tap gesture by placing the first mobile device 204*a* close (e.g., within four inches) to the first NFC token 218*a*. In response to the tap gesture, communication between the first mobile device 204*a* and the IoT service device 206 can be established and the proximity of the first mobile device 204*a* to the IoT service device 206 can be verified.

Additionally, in some examples, the computing environment 202 may authenticate the first mobile device 204*a* by verifying that the first mobile device 204*a* is a registered device for the online account 203 and/or the user account 210. For example, the computing environment 202 can generate a database 212. The database 212 can include registered devices 214 and corresponding user accounts 216. The database 212 can be updated by the computing environment 202 to establish the first mobile device 204*a* as a registered mobile device for the user account 210. In doing so, the first mobile device 204*a* can also be the registered mobile device for the online account 203. Therefore, the computing environment 202 can, in response to receiving the first request 222*a*, access the database 212 to verify that the first request 222*a* was received from the registered mobile device for the user account 210.

After authenticating the first user 207*a* and the first mobile device 204*a*, the computing environment 202 can transmit an application programming interface (API) call or otherwise communicate with the IoT service device 206 to cause the IoT service device to perform the first function 220*a*. In the example, the API used by the computing environment 202 can be an extension for financial services (XFS). In particular, the API can be XFS4. Therefore, the computing environment can communicate with and cause the IoT service device 206 to perform the first function 220*a* by transmitting the API call via the API (e.g., the XFS4). In this way, the computing environment 202 can automatically cause the IoT service device 206 to perform the first function 220*a* in response to the first request 222*a*. The first function 220*a* can be a first secure transaction 208*a* between the IoT service device 206 and the user account 210, such as a withdrawal of the amount of funds from the user account 210 as indicated by the first request 222*a*.

Additionally or alternatively, the computing environment 202 may receive a second request 222b from a second mobile device 204b. The second mobile device 204b can be an authorized device for the service provider. Thus, the second mobile device 204b can have higher privileges than the first mobile device 204a. For example, the second mobile device 204b can be used to request that the IoT service device 206 perform the functions 220a-b or may be used to request access to the online account 203, the user account 210, or a combination thereof on behalf of the first mobile device 204a. Additionally, the second mobile device 204b can be operated by a second user 207b. The second user 207b can be authorized personnel associated with the service provider or the IoT service device 206.

In an example, the computing environment 202 may detect an issue with the first request 222a. The issue may include the first authentication credentials 224a being invalid, the first mobile device 204a not being the registered mobile device for the user account 210, the computing environment 202 being unable to detect the proximity of the first mobile device 204a to the IoT service device 206, etc. In response to detecting the issue, the computing environment 202 may transmit a notification of the issue to the second mobile device 204b. The notification may further prompt the second mobile device 204b to transmit the second request 222b.

In response to receiving the second request 222b, the computing environment 202 can authenticate the second mobile device 204b. The computing environment 202 may also authenticate the second user 207b. For example, the computing environment 202 may authenticate the second user 207b by verifying that second authentication credentials 224b included in the second request 222b are valid for authorized personnel associated with the service provider.

Additionally, to authenticate the second mobile device 202b the computing environment 202 may verify that the second mobile device 202b is registered with the service provider or with the IoT service device 206 (i.e., verify that the second mobile device 202b is an authorized device). Additionally, the computing environment 202 may determine that the second mobile device 202b is proximate to the IoT service device 206 using NFC, location services of the second mobile device 204b, etc. In some examples, due to the higher privileges of the second mobile device 204b, the authentication of the second mobile device 204b may be more efficient than authentication of the first mobile device 204a.

Additionally, in some examples, the computing environment 202 may further determine the second mobile device 204b is proximate to the first mobile device 204a to authenticate the second mobile device 204b. For example, the second request 222b can be a request for the IoT service device 206 to perform a second function 220b on behalf of the first mobile device 204a. Thus, the second mobile device 204b may include or be associated with a second NFC token 218b. The first mobile device 204a or another suitable entity (e.g., a card associated with the user account 210) may be used to tap the second NFC token 218b. In this way, communication between the first mobile device 204a and the second mobile device 204b can be established, the second mobile device 204b can be authenticated, or a combination thereof.

After the second mobile device 204b is authenticated, the computing environment 202 can transmit an application programming interface (API) call or otherwise communicate with the IoT service device 206 to cause the IoT service device to perform a function. For example, the second request 222b may have been a request for the IoT service device 206 to perform a second function 220b. Thus, the computing environment 202 can cause the IoT service device 206 to perform the second function 220b via the API call. The second function 220b can be a second secure transaction 208b between the IoT service device 206 and the user account 210. For example, the IoT service device 206 can deposit of a certain amount of funds to the user account 210.

In some examples, the computing environment 202 can also include a terminal handler 201 for connecting, monitoring, and maintaining the system 200. The terminal handler 201 can manage interactions between the computing environment 202, the IoT service device 206, and the mobile devices 204a-b. For example, the terminal handler 201 can permit the mobile devices 204a-b to access the computing environment 202 by performing the authentication of the mobile devices 204a-b. The terminal handler 201 may also be able to monitor the IoT service device 206. For example, the terminal handler 201 may monitor cash levels of the ATM.

Figure 3:
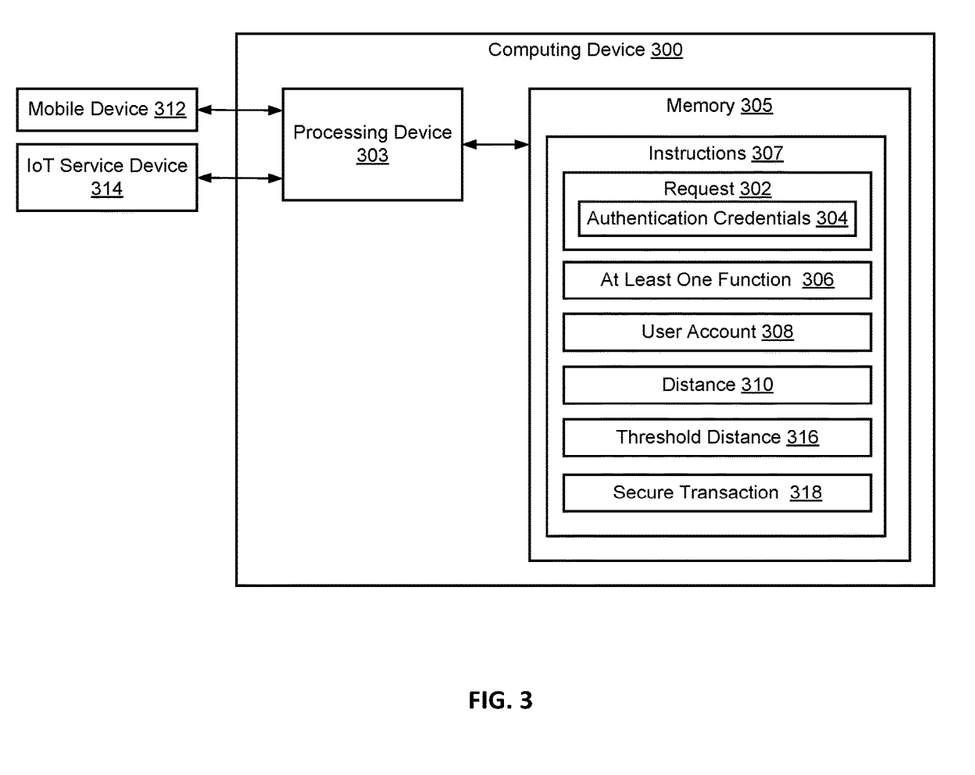
FIG. 3 is a block diagram of an example of a computing device for facilitating secure transactions between IoT service devices and user accounts according to one example of the present disclosure.

FIG. 3 is a block diagram of an example of a computing device 300 for facilitating secure transactions between IoT service devices and user accounts according to one example of the present disclosure. The components shown in FIG. 3, such as the processing device 303, the memory 305, and the like, may be integrated into a single structure such as within the single housing of the computing device 300. Alternatively, the components shown in FIG. 3 can be distributed from one another and in electrical communication with each other.

As shown, the computing device 300 includes the processing device 303 communicatively coupled to the memory 305. The processing device 303 can include one processor or multiple processors. Non-limiting examples of the processing device 303 include a Field-Programmable Gate Array (FPGA), an application specific integrated circuit (ASIC), a microprocessor, or any combination of these. The processing device 303 can execute instructions 307 stored in the memory 305 to perform operations. In some examples, the instructions 307 can include processor-specific instructions generated by a compiler or an interpreter from code written in any suitable computer-programming language, such as C, C++, C#, Python, or Java.

The memory 305 can include one memory device or multiple memory devices. The memory 305 can be non-volatile and may include any type of memory device that retains stored information when powered off. Non-limiting examples of the memory 305 include electrically erasable and programmable read-only memory (EEPROM), flash memory, or any other type of non-volatile memory. At least some of the memory 305 can include a non-transitory computer-readable medium from which the processing device 303 can read instructions 307. The non-transitory computer-readable medium can include electronic, optical, magnetic, or other storage devices capable of providing the processing device 303 with the instructions 307 or other program code. Non-limiting examples of the non-transitory computer-readable medium include magnetic disk(s), memory chip(s), RAM, an ASIC, or any other medium from which a computer processor can read instructions 307.

The processing device 303 can execute the instructions 307 to perform operations. For example, the processing device 303 can receive, from a mobile device 312, a request 302 to perform at least one function 306 of a IoT service device 314. The IoT service device 314 can be positioned in a location associated with a service provider. The request 302 can include authentication credentials 304 associated with a user account 308. The processing device 303 can authenticate a user of the mobile device 312 based on the authentication credentials 304. The processing device 303 can also authenticate the mobile device 312 based on a distance 310 between a location of the mobile device and the location associated with service provider being less than a threshold distance 316. Additionally, in response to authenticating the user and the mobile device 312, the processing device 303 can transmit an application programming interface (API) call to the IoT service device 314 to cause the IoT service device to perform the at least one function 306. The at least one function 306 can involve a secure transaction 318 between the IoT service device 314 and the user account 308.

Figure 4:
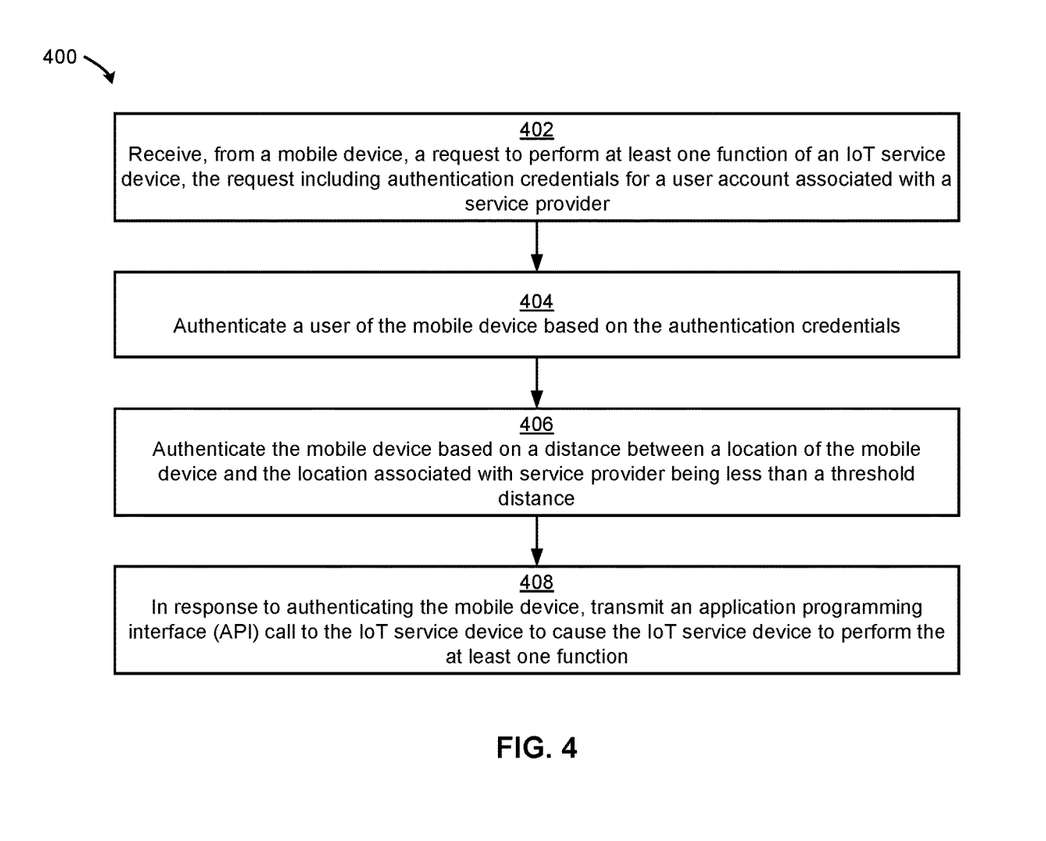
FIG. 4 is a flow chart of a computer-implemented process for facilitating secure transactions between IoT service devices and user accounts according to one example of the present disclosure.

FIG. 4 is a flowchart of a computer-implemented process 400 for facilitating secure transactions between IoT service devices and user accounts according to one example of the present disclosure. Operations of computer-implemented processes may be performed by software, firmware, hardware, or a combination thereof. The operations of the computer-implemented process 500 start at block 502. Other examples can include more steps, fewer steps, different steps, or a different order of the steps than is shown in FIG. 4. The steps of FIG. 4 are discussed below with reference to the components discussed above in relation to FIGS. 2 and 3.

At block 402, the computer-implemented process 400 involves receiving, from a mobile device 312, a request 302 to perform at least one function 306 of a IoT service device 314, the request 302 including authentication credentials 304 for a user account 308 associated with a service provider. The IoT service device 314 can be positioned in a location associated with the service provider. For example, the service provider can be a financial entity and the location can be a bank associated with the financial entity. Additionally, the request 302 may be received by a computing environment 202, such as a IoT platform. The request 302 can be transmitted as a result of a user of the mobile device 312 interacting with an online account 203. The user may interact with the online account 203 via a mobile application or web interface accessible on the mobile device 312. The online account 203 can be linked to the user account 308. The authentication credentials 304 for the user account 308 and may also be associated with the online account 203.

At block 404, the computer-implemented process 400 involves authenticating a user of the mobile device 312 based on the authentication credentials 304. Authenticating based on the authentication credentials 304 can include verifying that the authentication credentials 304 can be used to authenticate with the IoT service device 314, the online account 203, the user account 308, or a combination thereof. The computing environment 202 or a terminal handler 201 of the computing environment may perform the authentication of the user.

At block 406, the computer-implemented process 400 involves authenticating the mobile device 312 based on a distance between a location of the mobile device 312 and the location associated with the service provider being less than a threshold distance. For example, the mobile device 312 can include a geolocation device for determining a location of the mobile device 312. Thus, the computing environment 202, for example, may receive the location of the mobile device 312 and the location associated with the service provider. Then, the computing environment 202 can determine the distance between the location of the mobile device 312 and the location associated with service provider and can determine whether the distance is less than the threshold distance.

At block 408, the computer-implemented process 400 involves, in response to authenticating the user and the mobile device 312, transmitting an application programming interface (API) call to the IoT service device 314 to cause the IoT service device 314 to perform the at least one function 306. The API call can be transmitted by the computing environment 202 or by the terminal handler 201. The at least one function 306 can involve a secure transaction, such as a transfer of data, between the user account 308 and the IoT service device 314.

In a particular example, the request 302 can be for the IoT service device 314 to withdraw funds from the user account 308. The request 302 may further include an amount of funds for withdrawal, and the amount of funds may exceed a withdrawal limit. Due to the amount of funds exceeding the withdrawal limit, a step-up authentication protocol can be performed. For example, an authentication request for additional authentication credentials can be transmitted to the mobile device 312. The additional authentication credentials can be a one-time passcode (OTP), voice, face, or fingerprint identification, or another suitable form of additional authentication. The mobile device 312 can transmit the additional authentication credentials in a second request. In response to authenticating the additional authentication credentials, the API call can be transmitted and the IoT service device 314 can withdraw the amount of funds.

Figure 5:
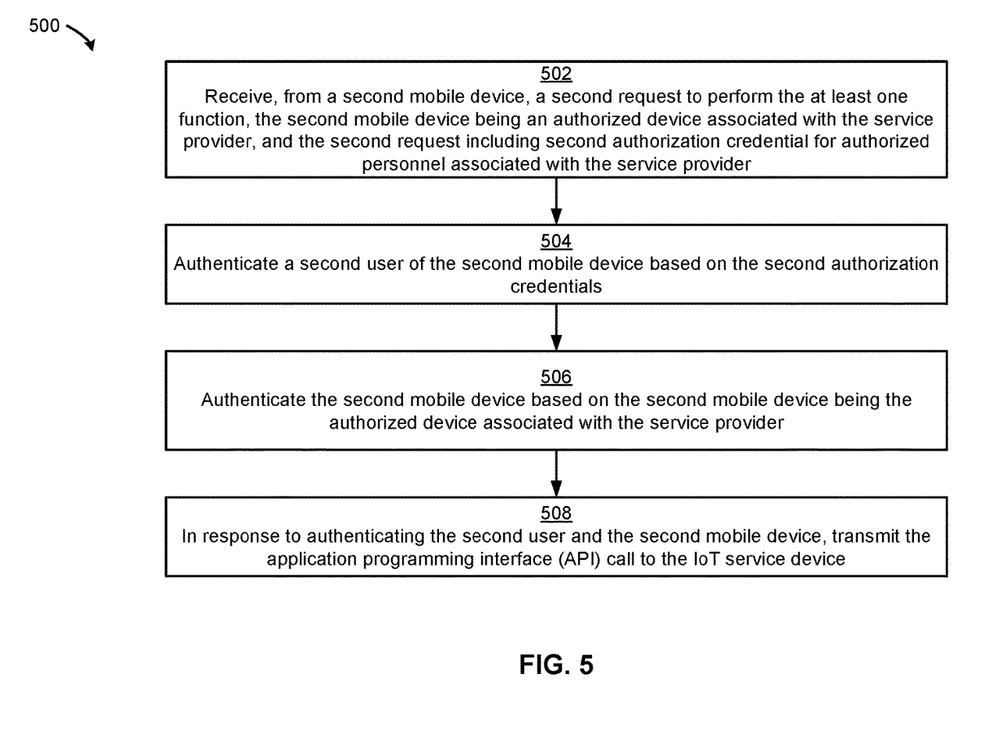
FIG. 5 is a flow chart of an alternative computer-implemented process for facilitating secure transactions between IoT service devices and user accounts according to one example of the present disclosure.

FIG. 5 is a flow chart of an alternative computer-implemented process 500 for facilitating secure transactions between IoT service devices and user accounts according to one example of the present disclosure. Operations of computer-implemented processes may be performed by software, firmware, hardware, or a combination thereof. The operations of the computer-implemented process 500 start at block 502. Other examples can include more steps, fewer steps, different steps, or a different order of the steps than is shown in FIG. 5. The steps of FIG. 5 are discussed below with reference to the components discussed above in relation to FIGS. 1, 2, and 3.

At block 502, the computer-implemented process 500 involves receiving, from a second mobile device 204b, a second request 222b to perform the at least one function 306, the second mobile device 204b being an authorized device associated with the service provider, and the second request 222b including second authentication credentials 224b for authorized personnel associated with the service provider. The second request 222b can be received by a computing environment 202. The second mobile device 204b can be registered with the computing environment 202 or otherwise registered to be the authorized device. Additionally, in some examples, receiving the second request 222b can involve detecting a tap gesture of the second mobile device 204b to a first NFC token 218a of the IoT service device 206.

Moreover, a second user 207b, who can be authorized personnel 148 for the service provider, can initiate the second request 222b after receiving a notification of an issue from a terminal handler 201 of the computing environment 202 that manages the IoT service device 206. The issue may be associated with a first request 222a transmitted by a first mobile device 204a. The issue can include a technical issue (i.e., disrupted communication between the first mobile device 204a and the IoT service device 206) or the issue can include an authentication issue. Examples of authentication issues can be due to an address change or other suitable changes in identifying information for a first user 207a associated with the first mobile device 204a. The authentication issues may also be due to the first mobile device 204a being an un-registered mobile device, the first user 207a being a new user, the first request 222a involving an interaction event in a specific category, a proximity of the first mobile device 204a to the IoT service device 206 being beyond a predetermined threshold distance, etc. The specific category can include withdrawal requests above a threshold amount.

At block 504, the computer-implemented process 500 involves authenticating the second user 207b of the second mobile device based on the second authentication credentials 224b. Authenticating based on the second authentication credentials 224b can include verifying that the authentication credentials 304 can be used to authenticate with the IoT service device 314, the service provider, or a combination thereof. The computing environment 202 may perform the authentication of the second user 207b.

Additionally, in some examples, the second user 207b can be asked to provide a secondary form of authorization as part of a multi-factor authentication protocol. For example, when prompted by the computing environment 202 or the terminal handler 201, the second user 207b can provide a passcode, touch a portion of the second mobile device for fingerprint recognition, accept a push notification to the second mobile device, or look into a camera of the second mobile device 204b for facial recognition. Once authenticated, the second user 207 can use the second mobile device 204b to supplement or override an authentication protocol for the first mobile device 204a. The computer-implemented process 500 can be terminated at block 504 if the terminal handler 201 fails to authenticate the second user 207b.

At block 506, the computer-implemented process 500 involves authenticating the second mobile device 204b based on the second mobile device being the authorized device associated with the service provider. For example, the second mobile device 204b may be registered with the service provider or registered with the IoT service device 206. The second mobile device 204b may be a tablet, laptop, or other suitable device and may be positioned in a location associated with the service provider.

Additionally or alternatively, authenticating the second mobile device 204b may include determining whether the second mobile device 204b is proximate to the IoT service device 206. For example, the second mobile device 204b can include a geolocation device to allow the computing environment 202 or the terminal handler 201 to determine a location of the second mobile device 204b. Then the proximity of the second mobile device 204b to the IoT service device 206 can be determined based on a distance between the location of the second mobile device 204b and the location associated with the service provide being less than a threshold distance, such as five meters. Additionally, in some examples, authenticating the second mobile device 204b can also include determining whether of the second mobile device 204b is proximate to the first mobile device 204a. The first mobile device 204a can also include a geolocation device to allow the computing environment 202 or the terminal handler 201 to determine a location of the first mobile device 204a. Then, the proximity of the second mobile device 204b to the first mobile device 204a can be determine based on a distance between the location of the second mobile device 204b and the location of the first mobile device 204a also being less than the threshold distance.

At block 508, the computer-implemented process 500 involves, in response to authenticating the second user 207b and the second mobile device 204b, transmitting an application programming interface (API) call to the IoT service device 206. The API call can be transmitted by the computing environment 202 or by the terminal handler 201. Transmitting the API call can cause the IoT service device 206 to perform the at least one function 306 as indicated by the second request 222b. The second mobile device 204b may have transmitted the second request 222b on behalf of the first mobile device 204a. Therefore, the IoT service device 206 may perform the at least one function 306 with respect to a user account 210 associated with the first user 207a, the first mobile device 204a, or a combination thereof. The at least one function 306 can involve a secure transaction, such as a transfer of data, between the user account 210 and the IoT service device 314.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
an Internet of Things (IoT) service device comprising hardware and positioned in a location associated with a service provider; and
a computing environment, the computing environment configured to control the IoT service device by:
receiving, from a first mobile device, a first request to perform at least one function of the IoT service device, the first request including first authentication credentials for a user account associated with the service provider;
authenticating a first user of the first mobile device based on the first authentication credentials;
authenticating the first mobile device based on a distance between a location of the first mobile device and the location associated with the service provider being less than a threshold distance;
receiving, from a second mobile device, a second request to perform the at least one function, the second mobile device being an authorized device associated with the service provider, and the second request including second authentication credentials for authorized personnel associated with the service provider;
authenticating a second user of the second mobile device based on the second authentication credentials;
authenticating the second mobile device based on the second mobile device being the authorized device associated with the service provider; and
in response to authenticating the first user and the first mobile device and to authenticating the second user and the second mobile device, transmitting an application programming interface (API) call to the IoT service device to cause the IoT service device to perform the at least one function, wherein the at least one function involves a secure transaction between the IoT service device and the user account.

2. The system of claim 1, wherein the computing environment further controls the IoT service device by:
detecting an issue with the first request; and
transmitting to the second mobile device a notification indicating the issue with the first request.

3. The system of claim 1, further comprising:
a near-field communication (NFC) token associated with the IoT service device.

4. The system of claim 3, wherein the computing environment receives, from the first mobile device, the first request by detecting a first tap gesture between the first mobile device and the NFC token, and wherein the computing environment receives, from the second mobile device, the second request by detecting a second tap gesture between the second mobile device and the NFC token.

5. The system of claim 4, wherein computing environment authenticates the first mobile device by determining, based on the first tap gesture, that the distance is less than the threshold distance.

6. The system of claim 1, wherein the computing environment further authenticates the first mobile device by:
generating a database, the database comprising a plurality of registered devices and a plurality of user accounts, wherein each registered device of the plurality of registered devices is associated with a user account of the plurality of user accounts;
updating the database to establish the first mobile device as a registered mobile device associated with the user account; and
accessing the database to verify that the first request was received from the registered mobile device associated with the user account.

7. A computer-implemented method comprising:
receiving, from a first mobile device, a first request to perform at least one function of an Internet of Things (IoT) service device, the IoT service device positioned in a location associated with a service provider, and the first request including first authentication credentials for a user account associated with the service provider;
authenticating a first user of the first mobile device based on the first authentication credentials;
authenticating the first mobile device based on a distance between a location of the first mobile device and the location associated with service provider being less than a threshold distance;
receiving, from a second mobile device, a second request to perform the at least one function, the second mobile device being an authorized device associated with the service provider, and the second request including second authentication credentials for authorized personnel associated with the service provider;
authenticating a second user of the second mobile device based on the second authentication credentials;
authenticating the second mobile device based on the second mobile device being the authorized device associated with the service provider; and
in response to authenticating the first user and the first mobile device and to authenticating the second user and the second mobile device, transmitting an application programming interface (API) call to the IoT service device to cause the IoT service device to perform the at least one function, wherein the at least one function involves a secure transaction between the IoT service device and the user account.

8. The computer-implemented method of claim 7, further comprising:
detecting an issue with the first request; and
transmitting to the second mobile device a notification indicating the issue with the first request.

9. The computer-implemented method of claim 7, wherein authenticating the first mobile device comprises:
detecting the first mobile device via a near-field communication (NFC) token associated with the IoT service device and detecting the second mobile device via the NFC token.

10. The computer-implemented method of claim 9, wherein receiving, from the first mobile device, the first request further comprises detecting a first tap gesture between the first mobile device and the NFC token, and wherein receiving, from the second mobile device, the second request further comprises detecting a second tap gesture between the second mobile device and the NFC token.

11. The computer-implemented method of claim 10, wherein authenticating the first mobile device comprises determining, based on the first tap gesture, that distance is less than the threshold distance.

12. The computer-implemented method of claim 7, wherein the authenticating the first mobile device further comprises:
generating a database, the database comprising a plurality of registered devices and a plurality of user accounts, wherein each registered device of the plurality of registered devices is associated with a user account of the plurality of user accounts;
updating the database to establish the first mobile device as a registered mobile device associated with the user account; and
accessing the database to verify that the first request was received from the registered mobile device associated with the user account.

13. A non-transitory computer-readable medium comprising instructions that are executable by a processing device for causing the processing device to perform operations comprising:
receiving, from a first mobile device, a first request to perform at least one function of an Internet of Things (IoT) service device, the IoT service device positioned in a location associated with a service provider, and the first request including first authentication credentials for a user account associated with the service provider;
authenticating a first user of the first mobile device based on the first authentication credentials;
authenticating the first mobile device based on a distance between a location of the first mobile device and the location associated with service provider being less than a threshold distance;
receiving, from a second mobile device, a second request to perform the at least one function, the second mobile device being an authorized device associated with the service provider, and the second request including second authentication credentials for authorized personnel associated with the service provider;
authenticating a second user of the second mobile device based on the second authentication credentials;
authenticating the second mobile device based on the second mobile device being the authorized device associated with the service provider; and
in response to authenticating the first user and the first mobile device and to authenticating the second user and the second mobile device, transmitting an application programming interface (API) call to the IoT service device to cause the IoT service device to perform the at least one function, wherein the at least one function involves a secure transaction between the IoT service device and the user account.

14. The non-transitory computer-readable medium of claim 13, the operations further comprising:

detecting an issue with the first request; and
transmitting to the second mobile device a notification indicating the issue with the first request.

15. The non-transitory computer-readable medium of claim 13, wherein the operation of authenticating the first mobile device comprises:
detecting the first mobile device via a near-field communication (NFC) token associated with the IoT service device and detecting the second mobile device via the NFC token.

16. The non-transitory computer-readable medium of claim 15, wherein the operation of receiving, from the first mobile device, the first request further comprises detecting a first tap gesture between the first mobile device and the NFC token, and wherein the operation of receiving, from the second mobile device, the second request further comprises detecting a second tap gesture between the second mobile device and the NFC token.

17. The non-transitory computer-readable medium of claim 16, wherein the operation of authenticating the first mobile device comprises determining, based on the first tap gesture, that distance is less than the threshold distance.

* * * * *